3,650,947
BIOLOGICAL PROCESS FOR PURIFICATION OF BREWERY EFFLUENT
Erik Krabbe, 12—56 117th St.,
College Point, N.Y. 11356
Filed Sept. 28, 1970, Ser. No. 75,958
Int. Cl. C02c 5/10
U.S. Cl. 210—15          8 Claims

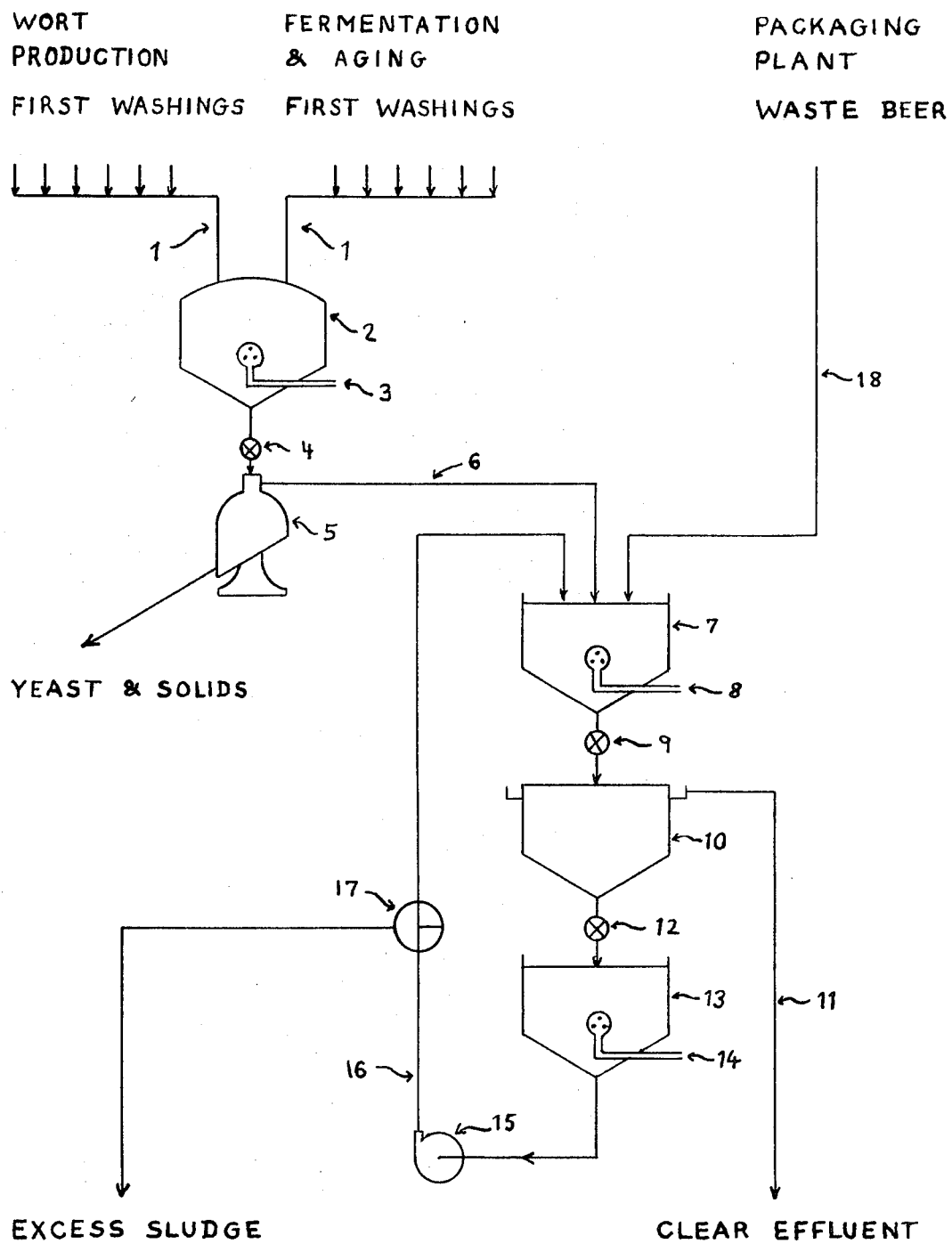

ABSTRACT OF THE DISCLOSURE

A two-stage biological process for purification of brewery effluent is provided wherein fermentation of sugars by means of aeration with yeast precedes treatment with activated sludge, thereby enhancing fluocculation and separation of biota from the purified effluent. The yeast may be recovered.

---

This invention relates to the enhancement of man's environment. More particularly, this invention is concerned with improvements in the biological purification of brewery waste water.

The object of this invention is to improve the fluocculation of biota so as to enhance biological purification of brewery effluent.

As used in this application, the term "brewery effluent" refers to aqueous waste from the production of beer. Brewing is normally a batch operation, but it includes aqueous discharges from processing: such as the last sparges or tailings from lautering; press-water from spent grains and hop sparge; as well as various process precipitates such as trub, settlings and yeast. These discharges are flushed into the brewery sewers during tank cleaning.

The original sources of the organic load in brewery effluent are wort, beer and yeast, each having a BOD of 100,000 p.p.m. or more; but, as a result of blending with rinse-water, cleaning solutions and cooling water, they are diluted about 50–100 times as they are discharged into the sewers in the brewery.

The BOD or biological oxygen demand of the untreated brewery effluent may vary from 600 p.p.m. to 4,000 p.p.m. The average BOD load of the raw effluent from a modern brewery is frequently 2,000 p.p.m. as compared to 200 to 250 p.p.m. for domestic sewage The discharge of waste from a brewery is about 10 times greater than the volume of the beer production. The total discharge of waste water from all the breweries in United States is of the order of 100,000,000 gallons per day.

For the treatment process which will be described later, it is important to note that the organic load in brewery waste is of two types: one fraction originating from the wort production section of the brewery contains fermentable sugars; the other fraction originating from the fermentation and aging section contains live yeast cells but only traces of fermentable sugars. The effluent from the packaging plant is of the second type but contains few yeast cells.

The traditional and common methods for purifying brewery effluent are adaptations of the methods used for treating domestic sewage. Primary treatment, namely gravity settling, is followed by biological treatments: in activated sludge systems, or on trickling filters on which biota grow. These continuous biological processes are referred to as secondary treatment. In order to accommodate brewery waste, activated sludge systems have been designed with a very low BOD loading; and for trickling filters a high rate of recycle has been provided. But neither of these processes has been free from operational problems.

Although brewery effluent is readily digested by the micro-organisms in biota from activated sludge or trickling filters, it frequently upsets and severely impairs the operational efficiency of conventional sewage treatment plants. Such disturbances result in bad odors and the discharge of foam and slime. The effects are offensive to the public and injurious to the environment.

The adverse impact of brewery effluent on the conventional effluent treatment systems entails a shift in the microbial population away from that normally encountered with domestic sewage. This disturbance is so pronounced that the effluent from a new brewery may upset the operation of a sewage treatment plant in a medium-sized municipality when the brewery is discharging directly to the sewer system.

The shift in the microbial population entails a proliferation of slime bacteria such as Sphaerotilus Nanans. This profuse growth of slime bacteria induced by brewery effluent causes these operational upsets: bulking, clogging and general impairment of the operational efficiency in conventional sewage treatment systems.

Slime-forming bacteria are always present in small numbers in the natural biota of the activated sludge process and on trickling filters. But the inventor has discovered that carbohydrates, and particularly fermentable sugars in brewery waste, intensely stimulate the growth of the disturbing slime bacteria.

According to one aspect of the present invention of a purification process for brewery effluent, there is provided a novel continuous biological process with two separate and consecutive stages of aerated microbial treatments. In the first stage, fermentable sugars from the wort production are metabolized my means of live yeast cells from the fermentation and aging section of the brewery to form new yeast cell material. In the second stage the effluent, now free of fermentable sugars, can be treated in an activated sludge system or on trickling filters, without operational disturbances, to reduce the BOD level of the effluent to a satisfactorily low level.

The yeast aeration tank also performs a useful purpose as a buffer tank. This is because brewing is a batch operation which normally is discontinued during the weekend; whereas the biological treatment with sludge is a continuous process requiring uninterrupted feed to maintain its biological flora during the weekend. The hold-up in the yeast aeration tank serves as an equalization storage for the biological sludge treatment in the second stage. The contents of the yeast aeration tank can be substantially reduced and be used for feeding the activated sludge in the second stage during the weekend interruption of the brewing operation. Because fresh yeast issues forth when the brewing production commences, the operation of the first stage of microbial treatment is not endangered by depletion during the weekend.

Because the organic discharges from the brewing process are wholesome in nature, it is desirable to provide for recovery of potential food for humans or animals. For this purpose a centrifugal recovery of solids is provided between the first and the second stage of microbial treatment in the preferred mode of this invention shown in the drawing. This recovery step also serves to reduce the ultimate BOD load which otherwise ends up as excess sludge and is disposed of by burning, burying or disposal at sea; thus contributing to the pollution load on the environment.

By fermenting the soluble sugars with yeast during the first step, the sugar fraction of the BOD load is converted into solid recoverable yeast cell material.

Some BOD-laden process wastes, such as drippings from the beer filling machines in the packaging plant and the rinse water from the cleaning of kegs and returnable bottles, contain contaminations from the outside and should not be used for recovery purposes. Because the waste beer is low in fermentable sugars, it may be added directly to the activated sludge in the second stage, without causing growth of slime bacteria or impairment of flocculation therein.

The preferred form of my invention provides: means for converting the fermentable sugars in brewery effluent to yeast cell material, means for separating yeast and solids from the pretreated effluents, and means for digesting the pretreated effluent with a natural biota of the sludge type to accomplish BOD reduction and clarification of the treated effluent. The drawing shows a schematic outline of this continuous two-stage biological process. Numerals identify the various parts.

Sanitary piping system 1 serves for collecting and transferring the first internal washings from brewery kettles and tanks to aeration tank 2. These washings contain the major BOD load in as clean and wholesome a condition as the original sources: wort yeast and beer. Tank 2, designed for sanitary operations, provides a liquid residence-time equivalent to 16–24 hours of average effluent flow, so as to provide at least 4 hours residence at all times. During this period the yeast contained in the washings from the fermentation section metabolizes the sugars contained in the washings from the wort production section of the brewery, thereby generating new yeast cell material. In this way the sugars are removed before the effluents come in contact with the natural biota in the second stage. Clean compressed air from an external source is injected into the combined washings in tank 2 by means of air dispersion nozzle 3 and at a rate which maintains at least one part per million of dissolved oxygen in the aqueous mixture. The outflow from tank 2 is regulated by means of valve 4 as it flows to centrifuge 5 which is of the automatic desludging or self-opening type.

The separated solids from centrifuge 5 are discharged in a wet form and may be dried or processed separately to provide an edible by-product; or they may be blended into other by-products from the brewing process, such as spent grains. If this mixture is used as is for animal food, it is preferable to pasteurize the wet solids from the centrifuge in order to inactivate the yeast cells.

The clarified liquor is discharged through pipe 6 to aeration tank 7 of the second stage. The clarified liquor is now free of fermentable sugar and the remaining soluble BOD material can be digested by the biota of the activated sludge without interference from profuse growth of slime bacteria. Air is supplied from an external source through dispersion nozzle 8 at a rate which maintains at least one part per million of dissolved oxygen in mixture of liquor and biota in tank 7. The air sparge also provides agitation and blending in tank 7. The volume of tank 7 provides a liquid residence time which accommodates the desired degree of BOD removal. Depending on the nature of the particular brewery waste and on the digestion rate of the natural biota, the residence time in tank 7 may vary from 5 to 10 hours. Valve 9 serves to regulate the outflow from tank 7 to clarifier 10 which provides gravity separation of the biota. The clarified overflow of treated effluent is discharged through pipe 11 for final disposal. The withdrawal of the underflow of concentrated biota is regulated by means of valve 12, as the biota flows into post-aeration tank 13. Air from an external source is injected through dispersing nozzle 14 to supply oxygen for the aerobic digestion of bio-adsorbed BOD material in the biota. Pump 15 recycles the biota through pipe 16 to second-stage aeration tank 7 for the purpose of maintaining a suitable concentration of biota therein. Three-way valve 17 in recycle line 16 serves to withdraw the excess sludge in order to maintain a proper sludge age of the biota in the second stage of biotreatment. Waste beer from the packaging plant is unsuitable for recovery purposes, but is free of fermentable sugars and is therefore conducted directly to activated sludge aeration tank 7 by means of conduit 18.

The present invention may be practiced with or without the feature of recovery of yeast solids. In the latter case all effluent may be introduced into aeration tank 2 of the first stage, and after treatment therein, it may be transferred directly to aeration tank 7 of the second stage without centrifugation.

When effluents contain only wort, or sugary substances such as corn syrup, then yeast from an external source may be added to remove the fermentable sugars by means of aeration.

The object of this invention is to improve flocculation of biota in biological treatment of brewery effluent. Therefore, the following arrangements of the present invention are useful.

If the brewery is connected to a public sewer then fermentable sugar may be removed from the brewery effluent by means of aeration with yeast at the brewery site, and the resulting pretreated effluent, free of fermentable sugars, may be discharged to the public sewer for aerobic treatment with biota of the activated sludge type at a municipal sewage treatment plant. In that case pipe 6 will represent the public sewer and the second stage, 7 through 17, will represent a municipal sewage treatment plant.

Another useful modification of the present invention serves to reduce the disturbing impact of brewery waste on municipal treatment plants. According to this modification, the present invention as described in the drawing is used for removing fermentable sugars and for reducing the BOD of pretreated effluent to about 250 p.p.m., equivalent to that of domestic sewage, and then discharging this effluent together with stabilized excess sludge to a public sewer for final treatment at a municipal sewage treatment plant.

What is claimed is:

1. A process for treating brewery wastes which comprises feeding wort production first washings to an aeration tank; feeding fermentation and aging first washings to the aeration tank; aerating the fed wort production first washings and the fed fermentation and aging first washings in the aeration tank so that fermented liquor is produced; separating solids from the fermented liquor so that clarified liquor is produced; feeding the clarified liquor to a biological treatment plant for further treatment.

2. A process for treating brewery wastes, as recited in claim 1, which further comprises: recovery of solids from the solids separator.

3. A process for treating brewery wastes as recited in claim 1, which further comprises: pasteurizing the solids from the solid separator; recovering the pasteurized solids.

4. A process for treating brewery wastes as recited in claim 1, which further comprises: feeding spent grains to a recovery tank; feeding pasteurized solids to the recovery tank; recovering solids.

5. A process for treating brewery wastes as recited in claim 1, which further comprises: feeding packaging plant effluent to the biological treatment plant.

6. A process for treating brewery wastes as recited in claim 1, which further comprises: retaining the fed wort production first washings and the fed fermentation and aging first washings in the aeration tank for a period of 4 to 8 hours.

7. A process for treating brewery wastes as recited in claim 1, which further comprises: retaining the fed wort production first washings and the fed fermentation and aging first washings in the aeration tank for a period of 1 (one) day.

8. A process for treating brewery wastes as recited in claim 1, which further comprises: retaining the fed wort production first washings and the fed fermentation and aging first washings in the aeration tank for a period of less than 2 days.

References Cited

Lin, P. W., Yeast Growing on Brewery Waste, Proc. Fifth Industrial Waste Conf., Purdue Univ., 1949, pp. 181–190.

MICHAEL ROGERS, Primary Examiner

U.S. Cl. X.R.

99—2, 31, 96